Figure 1:
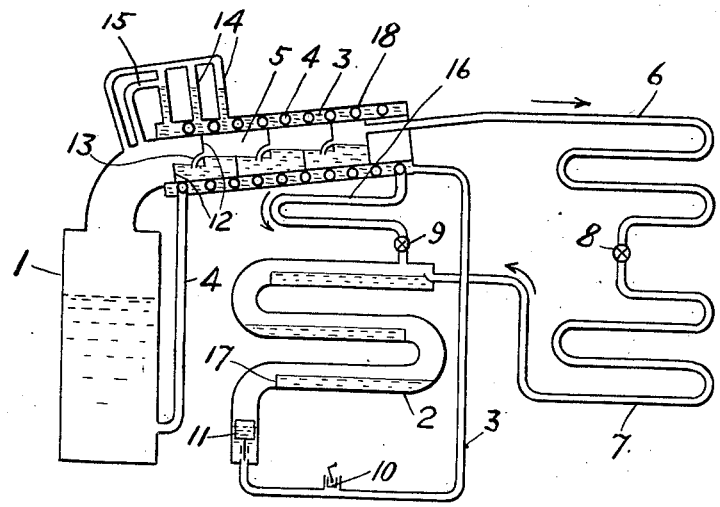

May 29, 1934.  S. A. B. DAHLGREN  1,960,809
REFRIGERATING APPARATUS
Filed Sept. 25, 1931

WITNESS:

INVENTOR
Sven Alfred Bertil Dahlgren
BY
ATTORNEYS.

Patented May 29, 1934

1,960,809

UNITED STATES PATENT OFFICE 1,960,809

REFRIGERATING APPARATUS

Sven Alfred Bertil Dahlgren, Alsten, Sweden, assignor, by mesne assignments, to Electrolux Servel Corporation, New York, N. Y., a corporation of Delaware Application September 25, 1931, Serial No. 565,048
In Sweden February 25, 1931

7 Claims. (Cl. 62—119)

The present invention relates to such continuously operating refrigerating apparatuses of the absorption type as are provided with boiler, absorber and heat interchanger. The invention is substantially characterized by a cooling down and a rectification of the vapors from the boiler, whereby the heat carried away from the vapors is completely recovered at the rectification within the apparatus, which rectification is obtained without any regulating means and under the most different working conditions.

In an apparatus of the above mentioned type it is known to allow the vapors from the boiler to pass through, or become mixed with, the rich solution arriving from the heat interchanger, whereby the vapors become enriched with the refrigerating agent. However, in such an operation the rectification will be far from complete, and the cooling effect, derived from a certain quantity of heat sacrificed, is comparatively small, especially if low temperatures are desired in the evaporator.

It is also known to cool down the vapors from the boiler by means of the rich solution before the solution enters the heat interchanger. A complete rectification can thereby be obtained and the heat from the vapors is taken up by the rich solution, but the quantity of heat that this solution can take up afterward, in the heat interchanger, from the weak solution, is reduced in about an amount corresponding to the rectifying heat.

It has also been proposed to cool down the vapors using only a part of the rich solution, which is by-passed around the heat interchanger in a separate conduit and which is led to the boiler in counter-current to the vapors. When the proportions between the quantity of by-passed rich solution and the quantity passing the heat interchanger are correctly balanced, the whole rectifying heat can generally be recovered, and this without doing it at the cost of the heat supplied from the weak solution. However, a required condition is that the quantity of by-passed solution shall be exactly regulated for each special case, and that the regulating means shall be so perfect that the proportions are maintained while the apparatus is working. Further, it is necessary to undertake a new regulation, should the working conditions be altered, for instance, by alterations in the temperature of the cooling water or cooling air.

Too large a quantity of by-passed solutions involves too much condensed refrigerating agent in the rectifier, which condensate, returned to the boiler, has to be again evaporated. On the other hand, too small a quantity of by-passed solution means an incomplete rectification.

When carrying through the rectification in this way an element of uncertainty is thus introduced, which more than counterbalances its theoretical advantages. By the present invention these objections are completely overcome and the whole rectifying heat is transferred to the rich solution without any reduction in the amount of heat delivered from the weak solution, which is all carried out without any regulation or means of regulation and under the most different conditions. The invention can therefore be utilized to advantage in apparatuses without valves and working with an inert gas to equilibrate the pressure between boiler, condenser, absorber and evaporator.

According to the invention the vapors from the boiler are led along a smaller or larger part of the heat interchanger and in such a way that a heat interchange takes place simultaneously between rich solution on the one side and weak solution and vapors on the other side.

The arrangement should be such that the condensate separated from the cooled vapors is so returned to the boiler that it moves in the opposite direction to the vapors and in contact with them, and also that the vapors separated from the rich solution by boiling in the heat interchanger can go off without hindrance towards the boiler or directly join the vapor from the boiler.

Figure 2:
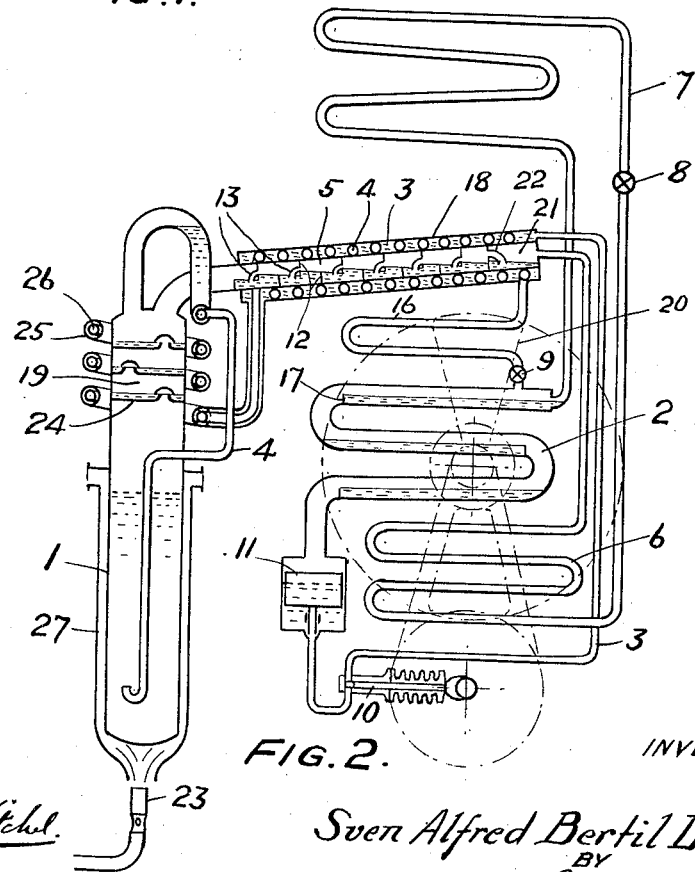

In the attached drawing, Figs. 1 and 2 are longitudinal sections illustrating respectively two of many different possible specific embodiments of the invention.

In the following description the refrigerating agent is assumed to be ammonia and the absorption liquid water, although the invention must not be considered to be limited to these media.

In the embodiment shown in Fig. 1, 1 is the boiler, 2 the absorber, 3 a conduit for solution rich in ammonia, 4 a conduit for solution poor in ammonia, and 5 a conduit for vapors distilled off in the boiler; the specific conduits 3, 4 and 5 being arranged in heat-conductive connection with each other. 6 is the condenser of the apparatus, 7 its evaporator, and 8 and 9 regulating valves for condensation of ammonia and weak solution respectively. 10 is a pump for rich solution and 11 a float, which regulates the flow of liquid to the pump.

The conduit 5 is arranged inclined so that condensate separated in the cooling of the vapors flows back to the boiler. The conduit 5 is also provided with weirs or walls 12 so arranged as to retain a certain quantity of condensate and to force the vapors through the condensate. The conduit 5 is also provided with tubes 13, through which the excess of condensate successively returns to the boiler.

An annular conduit for rich solution is formed in the heat interchanger by two concentric tubes 5 and 18. A spiral-shaped tube, constituting part of the conduit 4 for weak solution, extends through the conduit for rich solution, which, near that end thereof nearest to the boiler, is provided with a number of pipes 14, through which vapors, separated from the rich solution by boiling, can flow towards the boiler. A pipe 15 is arranged to carry off rich solution from the heat interchanger to the boiler. Weak solution from the heat interchanger, before it enters the absorber 2, is precooled in a pipe 16. The absorber 2 is provided with weirs or walls 17, in order to retain a certain quantity of solution in the absorber.

The apparatus operates in the following way: The boiler being heated by some suitable means, ammonia and water vapors are distilled off from the solution in the boiler. The vapors and the condensate in the conduit 5 are cooled down and become more and more rich in ammonia the closer they approach the condenser 6. The cooling ought to continue to such a temperature that practically pure ammonia vapors are delivered to the condenser.

In the condenser 6 heat is drawn off, by means, for instance, of cooling water, so that the vapors are condensed and the condensate possibly also undercooled. The pressure in the boiler and condenser is kept somewhat higher than the condensing pressure for ammonia at the temperature in the condenser, and usually varies between 8 and 20 atmospheres.

The condensate passes the regulating valve 8 and enters the evaporator, where a lower pressure is maintained and the ammonia evaporates, therefore, under absorption of heat, i. e., the temperature falls. The vapors then pass to the absorber and dissolve in the absorption liquid, which thus gets richer in ammonia. By the absorption, heat is produced and this is drawn off for instance by means of cooling water.

The absorption liquid, rich in ammonia in the lower part of the absorber, is withdrawn by the pump 10, which pumps it through the conduit 3 through the heat interchanger, from which the liquid passes to the boiler through the pipe 15.

Weak solution is led from the boiler through the heat interchanger in the spiral-shaped tube 4, is precooled in the tube 16, passes the regulating valve 9, which controls the quantity of liquid circulating through the apparatus, and finally enters the absorber. In the heat interchanger the whole rectifying heat is transferred to the rich solution, which furthermore precools the weak solution at the same time.

In the embodiment shown in Fig. 2, the hereinbefore described elements, although differing in form from those shown in Fig. 1, are the same in function and operation and there are applied thereto corresponding reference numerals. In this embodiment of the invention, the vapors from the boiler are first rectified in a special rectifier 19, above the boiler proper, by passing thereinto the rich solution, which enters the top of the rectifier after passing the heat interchanger. In the rectifier 19, the rich solution is spread over dividing bottoms 24, similar to those used in an ordinary distilling apparatus.

The vapors are then led along a part of the heat interchanger, viz., from a section where the temperature of the rich solution, when the apparatus is working, is somewhat lower than the boiling point of the rich solution, for instance 10 to 15 degrees centrigrade below the same, forward to a section where the temperature of the rich solution is near the temperature of condensation for the pure ammonia.

The part of the heat interchanger that is not arranged in heat-conductive connection with the conduit for the vapors, consists of two concentric tubes 25 and 26, formed as a cylindrical coil, with a vertical axis, arranged around the top of the boiler, in order to decrease the heat radiation from the apparatus. Rich solution is led upwardly between the two tubes so that vapors, separated from the rich solution by boiling, can go off without hindrance into the upper part of the rectifier.

This method of rectification is especially advantageous with air-cooled apparatus or when cooling water of low temperature is not available, for instance in tropical countries. In an apparatus working under these conditions, the rectifying heat at a complete rectification will be great and in certain cases it would not be possible to wholly transfer it in the heat interchanger alone, as the amount of the heat that the weak solution gives off plus the whole rectifying heat is greater than the amount which the rich solution can take up. In the just described operation, however, part of the rectifying heat is transferred in the rectifier 19 to the rich solution after it has passed the heat interchanger and the remaining rectifying heat is transferred in the heat interchanger.

In the apparatus shown in Fig. 2 the boiler has the shape of a tall, vertical cylinder, whereby a certain rectifying action is obtained even in the boiler. The rich solution that enters the boiler has a lower specific gravity than the weak solution and will therefore remain at the surface, the concentration decreasing successively towards the bottom of the boiler. During the boiling the vapors form mainly at the bottom of the boiler and thus must pass a solution of progressively increasing richness, whereby a concentration of ammonia in the vapors takes place.

In Fig. 2 is also shown a tube 22, through which the rectified vapors flow into a chamber 21, formed by the prolongation of the tube 5. The chamber 21 is also arranged in heat-conductive connection with the conduits for rich and weak solutions and a further quantity of heat is given off from the vapors in this chamber and is taken up by the rich solution. The condensate from this latter cooling of the vapors is led to the condenser 6. Such an arrangement, however, is more suitable when the rectifying heat is small.

In other respects the apparatus of Fig. 2 operates exactly as that illustrated in Fig. 1. The apparatus of Fig. 2 is shown as gas-heated and air-cooled. At the bottom of the boiler is shown a Bunsen heater 23, the gases from which move upward between the boiler and the cover 27. The air cooling is obtained by a fan 20, although a fan is not necessary. If a fan or equivalent air-circulating means should not be used, larger cooling surfaces would be required. In any case, the parts of the apparatus which require to be cooled ought to be provided with cooling ribs (not shown).

In order to facilitate the handling, and reduce the risk of leakage, of ammonia and absorption liquid, the pump may be constructed as a membrane pump or as a piston driven by electromagnetic pulsations, and the plungers of the regulating valves may be fitted on membranes, in order to completely enclose these organs within the apparatus, their movement or displacement being controlled by externally operable connections.

The invention must not be considered as limited to the above described embodiments, it being possible to make modifications without departing from the principle of the invention. This same principle can also be applied to resorption apparatus in order to deliver pure ammonia to the resorber and to decrease the amount of heat required for the apparatus.

Having now fully described my invention, what I claim and desire to protect by Letters Patent is:

1. A refrigerating apparatus of the absorption type comprising a boiler, an absorber, a conduit for rich solution between the absorber and the boiler, a conduit for vapors connected with the boiler, a conduit for weak solution connected with the boiler, the last two named conduits being in heat exchange relation with the first named conduit, and walls within the heat exchange portion of said conduit for vapors adapted to so maintain a plurality of pools of condensate formed by the cooling of vapors as to force vapors to flow through said pools of condensate in series.

2. A refrigerating apparatus of the absorption type comprising a boiler, an absorber, a conduit for rich solution between the absorber and the boiler, a conduit for vapors connected with the boiler, a conduit for weak solution connected with the boiler, the last two named conduits being in heat exchange relation with the first named conduit, walls within the heat exchange portion of said conduit for vapors adapted to so retain and position condensate formed by the cooling of vapors as to force vapors to flow through said condensate, and tubes adapted to allow excess accumulating condensate to flow backward in said vapor conduit toward the boiler.

3. A refrigerating apparatus of the absorption type comprising a boiler, an absorber, a conduit for rich solution between the absorber and the boiler, a conduit for vapors connected with the boiler, a conduit for weak solution connected with the boiler, the last two named conduits being in heat exchange relation with the first named conduit, and a separate conduit, connecting the conduit for rich solution with the vapor space of the boiler, through which vapors, separated from the rich solution by boiling, return to the boiler.

4. A refrigerating apparatus comprising a boiler, a condenser, a conduit for vapors between the boiler and condenser, an absorber, a conduit for rich solution between the absorber and the boiler, a conduit for weak solution between the boiler and absorber, the conduit for rich solution being in heat exchange relation with the other two conduits, a chamber for rectified vapors in heat exchange relation with the conduits for rich and weak solutions and so positioned in the path of travel of the vapors from the conduit for vapors to the condenser that condensate, separated by cooling of the vapors, goes to the condenser.

5. In a refrigerating apparatus of the absorption type having means for conducting rich absorption solution in simultaneous heat transfer relation with weak solution and generated vapors, means for causing the vapors to bubble through condensate therefrom in the heat exchange portion of first said means.

6. In absorption type refrigerating apparatus including a generator and absorber, a heat exchanger comprising an upwardly sloping conduit for vapors from said generator, conduits for circulation of absorption solution between said generator and absorber and arranged in heat exchange relation with said vapor conduit, and weirs in said sloping vapor conduit for maintaining a liquid seal of condensate resulting from the cooling of the vapors.

7. In an absorption type refrigerating apparatus having a generator, an absorber, and condenser, a heat exchanger comprising an upwardly sloping conduit connected between said generator and condenser, a jacket around said conduit connected for passage therethrough of strong solution flowing from said absorber to the generator, a pipe coil within said jacket connected for the passage therethrough of weak solution flowing from said generator to the absorber, and members in said vapor conduit for restraining the backward flow of condensate resulting from cooling of the vapors.

SVEN ALFRED BERTIL DAHLGREN.